United States Patent [19]

Davis

[11] Patent Number: 4,641,124
[45] Date of Patent: Feb. 3, 1987

[54] VEHICLE SECURITY ALARM

[76] Inventor: Dwin S. Davis, P.O. Box 66, Choctaw, Okla. 73020

[21] Appl. No.: 417,480

[22] Filed: Sep. 13, 1982

[51] Int. Cl.[4] ............................................. B60R 25/04
[52] U.S. Cl. ..................................... 340/64; 340/523; 307/10 AT
[58] Field of Search ..................... 340/63, 64, 65, 134, 340/321, 322, 521, 522, 523; 307/10 AT; 180/287

[56] References Cited

U.S. PATENT DOCUMENTS

| | | | |
|---|---|---|---|
| 2,823,367 | 2/1958 | Huron | 340/52 |
| 3,461,423 | 8/1969 | Trumble | 340/52 |
| 3,562,706 | 2/1971 | Mason | 340/65 |
| 3,585,584 | 6/1971 | Behrend | 340/64 |
| 3,611,287 | 10/1971 | Hoff et al. | 340/63 |
| 3,634,724 | 1/1972 | Vest | 307/10 AT |
| 3,649,962 | 3/1972 | Bedard | 340/64 |
| 3,659,266 | 4/1972 | Meyerle | 340/64 |
| 3,683,362 | 8/1972 | Schwanenflugel | 340/322 |
| 3,728,675 | 4/1973 | Horn et al. | 340/65 |
| 3,755,778 | 8/1973 | Kennedy et al. | 340/65 |
| 3,772,646 | 11/1973 | Keith et al. | 340/65 |
| 3,781,804 | 12/1973 | Lederer | 340/64 |
| 3,824,403 | 7/1974 | McGuirk | 340/63 X |
| 3,866,168 | 2/1975 | McGuirk | 340/63 X |
| 3,968,474 | 7/1976 | Danahey | 340/63 |
| 3,979,740 | 9/1976 | Forbat | 340/522 |
| 4,006,452 | 2/1977 | Giacino | 340/65 |
| 4,053,869 | 10/1977 | Quercia | 340/64 |
| 4,107,962 | 8/1978 | MacKinnon | 70/243 |
| 4,151,507 | 4/1979 | Willis | 340/64 |
| 4,291,296 | 9/1981 | Seifers | 340/64 |
| 4,302,747 | 11/1981 | Belmuth | 340/64 |
| 4,349,812 | 9/1982 | Healey | 340/522 |
| 4,358,750 | 11/1982 | Webster | 340/65 |
| 4,518,946 | 5/1985 | Solomon | 340/326 |
| 4,551,703 | 11/1985 | Bourauel | 340/522 |

OTHER PUBLICATIONS

"'Tips' For Customizing Your Installation", Milo Systems, Fullerton, Cal., Mar. 31, 1983.
"New Motorcycle Alarm" by I. Berger, Popular Mechanics, 139(6), Jun., 1973. p. 180.
"Stop Burglars With Electronics" by H. Phillips, Radio-Electronics, vol. 42, Nov., 1971, pp. 35-36.
"SN76495 Complex Sound Generator", Texas Instruments, Jan. 1981, 10 pp.
"Alarm Circuits Using the Texas Instruments SN76495N" by T. Mahler, undated, 3 pp.
"Motion Alarm" drawings, Texas Instruments engineer, 10/27/81, 2 pp. preceded by circuit sheets for SN16923N, 4 pp., and thyristors, 2 pp.

Primary Examiner—John W. Caldwell, Sr.
Assistant Examiner—Michael F. Heim
Attorney, Agent, or Firm—Senniger, Powers, Leavitt and Roedel

[57] ABSTRACT

A motor vehicle antitheft alarm provides complex sounds, is disabled in normal use of the vehicle, and is resistant to "hotwiring" of the ignition notwithstanding. Unauthorized motion of the vehicle causes a disturbance sensor to activate the alarm circuit. Qualitatively different alarm sounds are provided in response to repeated disturbances as compared with isolated ones. When the ignition is turned on in normal use, a first voltage condition is provided to disable the alarm apparatus. After the ignition is turned off a short time of disabling is provided to permit the user to leave the vehicle before the alarm can be activated. An anti-hotwiring turn-on circuit associated with the ignition switch provides a second voltage condition, or allows same, blocking the first voltage condition from occurring during hotwiring. A voltage-sensitive circuit sets off the alarm when the second voltage condition occurs, deterring hotwiring. The alarm automatically turns off after a period of time, conserving battery power and affording owner convenience. When the vehicle is a motorcycle or moped, the center stand is provided with a switch for preventing alarm sounds during normal maintenance with the center stand down. A backup battery and other circuit-protecting measures are providable in the alarm unit which is located in a secure part of the vehicle.

24 Claims, 5 Drawing Figures

VEHICLE SECURITY ALARM

BACKGROUND OF THE INVENTION

The present invention relates to the field of vehicle security alarms. More specifically, the present invention relates to improved owner convenience features, antihotwiring and other security features in vehicle security alarms.

Without deemphasizing the applicability of the invention to all vehicles, the background of the invention is discussed in connection with bicyclar, or two-wheeled, vehicles such as motorcycles. The relatively light weight and greater accessibility of such vehicles makes them more subject to animals, children at innocent play, pranksters, and thieves of a variety of levels of sophistication. This is because such vehicles can often be pushed over, rolled away by hand, or even carried off. Moreover, they frequently have exposed engine areas permitting disadvantageously effective tampering. And because motorcycles are relatively inexpensive, security devices for them must be kept correspondingly inexpensive to attract a market.

If a security device is to be convenient to the owner, it must be unobtrusive in the normal use of the vehicle by the owner or authorized user, as in starting the motorcycle, traveling thereon, getting off, and in maintenance. Unfortunately, if the normal use of the ignition circuit is employed by owner to disable the security alarm device, then a thief hotwiring the ignition in the engine area of the motorcycle can disable the security alarm device too. Moreover, when the motorcycle is undergoing maintenance with ignition off, the owner himself or herself can be annoyed by false alarms.

Many vehicle security alarms are readily defeated merely by cutting or disconnecting external power wires, shorting external lead wires together, or applying unauthorized voltages to the external lead wires.

The sounds emitted by vehicle security alarms are not readily noticed by owner or bystanders in noisy neighborhoods having a variety of traffic noises and random sounds. Moreover, known alarms are quite predictable in the sounds emitted, thus foregoing psychological deterrence potentialities.

In some devices, the use of a latching solenoid, to keep the alarm sounding indefinitely after unauthorized bumping has ceased, runs down the battery power and forces the owner to physically come to the motorcycle in all cases, regardless of whether there remains any need to approach. This can be especially annoying to the owner when the alarm goes off at night.

Accordingly, problems have persisted in the field of security devices for vehicles notwithstanding many attempts in the prior art to overcome them.

SUMMARY OF THE INVENTION

In the present invention, the foregoing problems are solved in a motorized vehicle having an ignition switch, a battery and an ignition system by providing alarm emitting apparatus and a circuit for disabling the alarm emitting apparatus when the ignition switch is on. Sensing apparatus is provided for turning on the alarm emitting apparatus when the ignition switch is off when the vehicle is bumped or displaced from a rest position. A blocking circuit is provided for the disabling circuit so that when the battery is electrically connected to the ignition system otherwise than by operation of the ignition switch, as in hotwiring, the ignition does not disable the alarm emitting device.

Maintenance by owner without attention to the security alarm is accommodated by providing, in vehicles with a center stand for raising, a circuit for preventing the alarm emitting device from operating when the center is in its extended, vehicle-raising, position.

For example, an inexpensive version of the invention utilizes an electromechanical alarm sounder having sounder contacts and a sounder coil. A disabling circuit conducts a disabling current from the ignition through the sounder coil itself to hold the sounder contacts open, thereby disabling the electromechanical sounder when the ignition switch is on. In this way the need for any separate disabling relay or transistor is eliminated. When the ignition switch is off, the disabling circuit also limits or stops any current in the sounder contacts from bypassing the sounder coil through the disabling circuit.

In addition, a blocking circuit for avoiding hotwiring and providing alarm availability in spite of hotwiring is in this inexpensive version as uncomplicated as a single part. The part is suitably a single diode from ignition switch to ignition system connected so as to be backbiased in a hotwiring situation; or the blocking circuit is a second switch section provided in the ignition switch assembly so that the disabling circuit is isolated from hotwiring by the open section when the ignition switch is off.

More complex blocking circuitry provides additional features to those provided by the antihotwiring diode or antihotwiring switch section. Such blocking circuitry is made voltage sensitive for instance. Means for providing a reduced voltage for disabling purposes is associated, for example, with the ignition switch. The blocking circuit permits the reduced voltage to operate the disabling circuit of the security alarm when the ignition switch is on. In contrast, hotwiring technique is likely to conduct full battery voltage to the disabling circuit of the security alarm. In the invention the blocking circuitry is in more complex embodiments made voltage-sensitive so that full battery voltage from hotwiring is isolated from the disabling circuit and so that instead, the alarm is set off by the act of hotwiring itself.

To be even more general, in this aspect of the invention for responding to hotwiring, means for modifying the battery voltage in voltage, as just discussed, or from DC to AC, or in some other way, is provided. Also the blocking circuit is constructed so as to be sensitive to unmodified, or incorrectly modified, battery voltage, and so as to respond so as to isolate the disabling circuit and set off the security alarm when hotwiring occurs.

In another feature of the invention the alarm circuit is provided in a closed container unit inside a lockable storage compartment of the vehicle. A backup battery is provided inside the closed container and is provided with protective circuitry to prevent it from being discharged or rendered inoperative by unauthorized physical and electrical manipulations on external lead wires to the security alarm.

In an additional feature of the invention the alarm emitting device is made so as to emit complex sounds such as a series of beeps in response to a single bump of the vehicle, or single instance of hotwiring, with a degree of unpredictability or complexity of response. The vehicle lights are also advantageously controlled so that they turn on and off in an emergency mode in high-noise and other environments. The alarm emitting device includes an alarm sounder, a light emitting apparatus, a radio transmitter, apparatus for sending an alarm control signal to vehicle wheel-locking, ignition-disabling, and/or camera-actuating mechanisms, or other alarm emitting apparatus or combination of the foregoing. Psychological deterrence is further enhanced by providing a first alarm response to a first disturbance and a second, qualitatively different, alarm response to a second disturbance.

In still further features of the invention, circuitry is provided to keep the security alarm disabled for a predetermined period after the ignition switch is turned from on to off so as to avoid an annoying false alarm to the authorized user when leaving the vehicle subsequent to operating it. In the distinct circumstance when the alarm has been triggered and an alarm signal is being emitted, circuitry is provided so that the alarm is deactivated after a second predetermined length of time so that battery power is not unduly dissipated by operation of the security alarm and so that the owner may elect not to approach the vehicle.

DETAILED DESCRIPTION OF THE DRAWING

Figures 1, 1A:
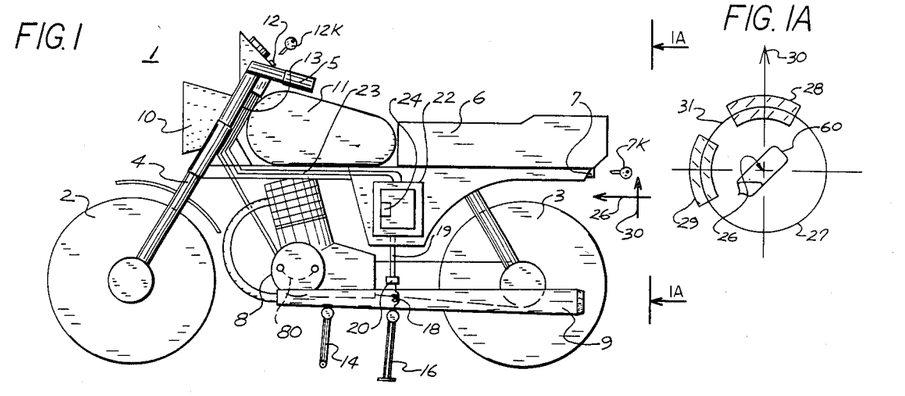
FIG. 1 is a side-view sketch of a motorcycle provided with a vehicle security alarm of the invention.
FIG. 1A is a sensitivity diagram for the vehicle of FIG. 1 around its roll axis.
Figures 2, 4:
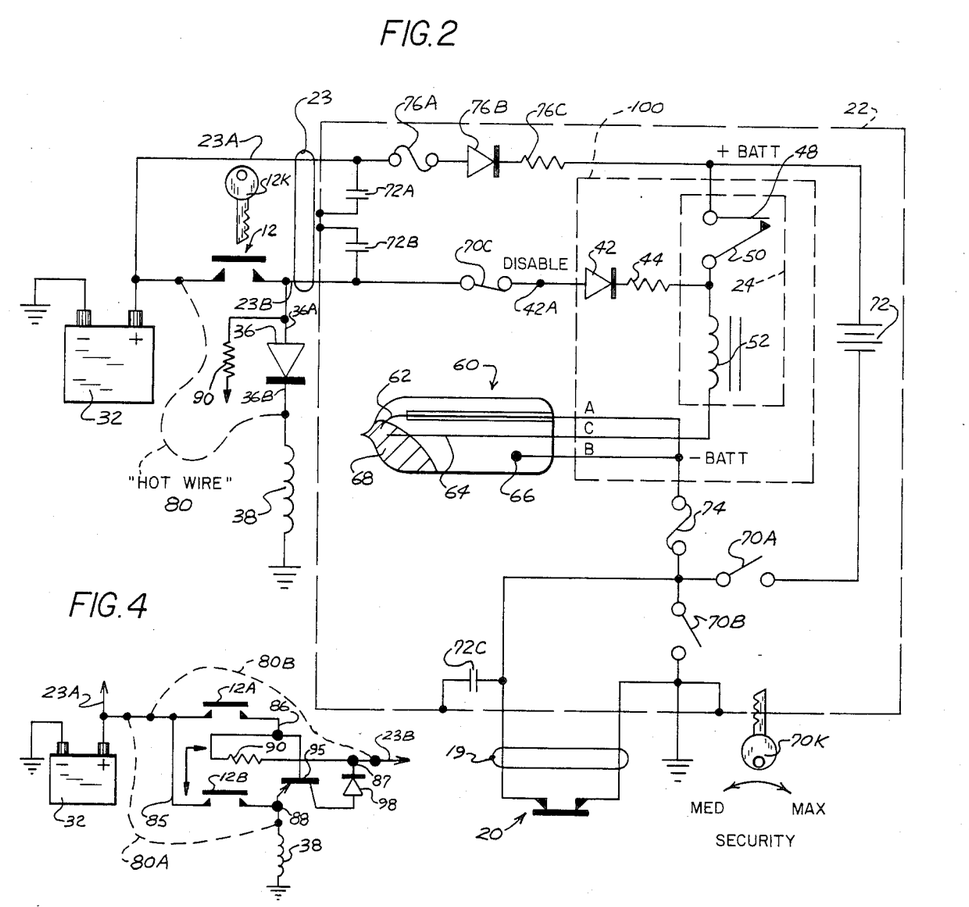
FIG. 2 is an electrical schematic diagram of a vehicle security alarm connected to the ignition switch and ignition system of a motorcycle as shown in FIG. 1 and according to the invention.
FIG. 4 is an electrical schematic diagram of an alternative blocking circuit with additional anti-hotwiring features, for use with blocking circuitry 300 of FIG. 3. It is emphasized that circuitry 300 is omitted from circuit portion 100' unless voltage reduction means shown in FIG. 4 or providable in line 23B of FIG. 2 are utilized, in the context of this voltage-sensitive embodiment.

In FIG. 1 motorcycle 1 has wheels 2 and 3, metal frame 4, handlebars 5, seat 6 with battery 32 of FIG. 2 (not shown) thereunder, lockable storage compartment 7, engine and battery cabling area 8, exhaust assembly 9, horn and light unit 10, a dash including ignition switch 12, fuel tank 11, ignition switch cable 13, side stand 14, and main stand or center stand 16. Motorcycle 1, such as a Suzuki GS1100, is retrofitted with a security alarm unit 22 in compartment 7, which is in turn locked by key 7K. Security alarm unit 22 is connected to ignition switch 12, and battery 32, and to frame 4 by cable 23 which is mounted inconspicuously. Cable 19 connects security alarm unit 22 to a normally-closed switch 20. The arrangement of center stand 16, linking spring 18, and normally-closed switch 20 is provided so that only when center stand 16 is extended to raise and support motorcycle 1 during routine maintenance is the security alarm 22 disabled by center stand 16 pulling or releasing spring 18 so as to open switch 20. Sounder 24 mounted in security alarm unit 22 provides piercingly audible alarm indications in response to unauthorized disturbances to motorcycle 1.

In FIG. 1 the vertical is indicated by arrow 30. The roll axis of motorcycle 1 is indicated by arrow 26. FIG. 1A is a diagram of alarm unit 22 sensitivity to disturbances in orientation, looking in the direction of roll axis arrow 26. Circle 27 is drawn with roll axis 26 as its center, for facilitating discussion of the sensitive areas around circle 27 which alarm unit 22 can have its tilt sensor, or other disturbance sensor, designed for. It is contemplated that when the motorcycle 1 is in motion, motorcycle 1 is upright in the vertical direction of arrow 30 so that sensitive area 28 intersects vertical arrow 30. However, in authorized use ignition key 12K is turned on, disabling security alarm unit 22 from emitting any annoying false alarm. When the motorcycle 1 is brought to rest and rested on sidestand 14, motorcycle 1 leans sideways to some extent so that insensitive area 31 turns clockwise around the circle 27 and intersects vertical arrow 30. Even with ignition key 12K turned off, the security alarm unit 22 does not sound an alarm because of the insensitive area 31.

When, however, an unauthorized person or animal pushes the motorcycle 1 farther over, sensitive area 29 crosses vertical arrow 30 so that an alarm is emitted. When motorcycle 1 is alternatively pushed upright without ignition 12 being turned on, sensitive area 28 moves counterclockwise around circle 27 so that it intersects vertical arrow 30 and sounding an alarm. Authorized persons are able to use motorcycle 1 without sounding the alarm merely by turning on ignition switch 12 before moving motorcycle 1, so as to electrically disable security alarm 22. Also, maintenance by an authorized person is readily and conveniently performed by putting the cycle 1 up on its center stand 16, disabling the security alarm unit 22 without need of putting key 12K in ignition switch 12 or turning it on.

In the inventive electrical circuit of FIG. 2, main storage battery 32 is the vehicle battery of motorcycle 1 and has its negative (−) post grounded to frame 4. The positive (+) post is connected to normally-open ignition switch 12 via ignition cable 13 of FIG. 1. Ignition switch 12 is also connected along with battery 32 positive lead 23A in cable 23 to security alarm unit 22. When the ignition switch 12 is turned on, a circuit through ignition switch 12 is closed, permitting electrical current to pass through anti-hotwiring diode 36 to an ignition system including ignition coil 38 of FIG. 2 in engine area 8 of FIG. 1. The ignition switch 12 also connects battery positive voltage to cable 23 line 23B to security alarm unit 22. Such voltage is used to disable security alarm unit 22. The invention is suited not only to original equipment installation but also to retrofit kit application in existing motorcycles, mopeds, and other vehicles, in this anti-hotwiring diode aspect. Advantageously, an additional ignition switch section can alternatively be provided as discussed in connection with FIG. 4, suiting the invention to a variety of engineering economic situations.

When the ignition switch 12 is on, the alarm circuit of unit 22 can be disabled in the "Medium Security" mode position of security key 70K, later described, because it is assumed that an authorized user will have and use ignition key 12K and switch 12 to turn the ignition system on. However, if an unauthorized person enters battery and engine area 8 and circumvents ignition switch 12 by means of "Hot Wire" 80, then the motorcycle alarm circuit of unit 22 is not disabled as if the ignition switch 12 had been turned on.

The reason for the advantageous antihotwiring feature is the provision of diode 36. Diode 36 in a first physical configuration is provided physically close to ignition switch 12 where cable 23 connects to the ignition switch 12. When Hot Wire 80 is connected as shown in FIGS. 1 and 2 by tampering in area 8, no ignition current can pass through back-biased diode 36 to the disabling line 23B of unit 22. Accordingly, hot-wiring fails to disable the alarm circuit 22.

In a second physical configuration, diode 36 is located inside security alarm unit 22 in a storage compartment 7. Diode 36 lead 36A is still connected to cable line 23B, but inside unit 22. Diode 36 lead 36B is brought out from unit 22 as a third lead in cable 23 connecting to coil 38. The first and second physical configurations are electrically equivalent and defeat hotwiring in the same way. However, each provides slightly different practical convenience and marketing and manufacturing features in preparing the invention as original equipment or in a retrofit kit.

In a third physical configuration (not shown) diode 36 is located inside security alarm unit 22 and diode lead 36A is disconnected from cable line 23B and connected instead at disabling input 42A. In this third configuration, hotwiring is defeated in the same manner as in the previous configurations with switch 70C in the "Medium Security" position. However, in the "Maximum Security" (open) position of security switch portion 70C, coil 38 is disconnected from ignition switch 12, so that even unauthorized use of key 12K itself fails to provide power to the ignition system including coil 38 as well as fails to disable security alarm unit 22.

In the "Medium Security" mode of alarm circuit of unit 22 set by switch sections 70A, 70B, and 70C being open, open, and closed respectively by key 70K as shown in FIG. 2 as drawn, advantageous motorcycle 1 protection is obtained from animals, small children, and less-sophisticated pranksters and thieves. In this "Medium Security" mode, alarm control assembly 100 is connected to battery 32 line 23A through protective fuse 76A, diode 76B, and small current-limiting resistor 76C. Alarm control assembly 100 is also connected to the negative post of battery 32 through protective fuse 74 and normally-closed center stand switch 20.

Position-sensitive mercury switch 60 is stiffly but adjustably mounted suitably with its long axis extending relative to motorcycle 1 in a sideways direction perpendicular both to vertical arrow 30 and roll axis 26 of FIG. 1A. The mercury switch 60 is mounted and adjusted in orientation so that when motorcycle 1 of FIG. 1 is resting on side-stand 14, mercury 68 in mercury switch 60 closes no circuit between wires A, B, and C therein, corresponding to insensitive area 31 intersecting vertical arrow 30 in FIG. 1A. Then when motorcycle 1 is unauthorizedly uprighted with sensitive region 28 intersecting vertical arrow 30 of FIG. 1A, mercury 68 slides leftward in FIG. 2 closing a circuit between the exposed end of otherwise insulated electrode A of mercury switch 60 and the electrode C thereof, as shown in FIG. 2 as drawn. If and when, on the other hand, motorcycle 1 is pushed in the opposite direction, farther over, sensitive region 29 of FIG. 1A intersects vertical arrow 30. Then mercury 68 in FIG. 2 slides to the right and closes a circuit between electrodes B and C of mercury switch 60.

In FIG. 2, both electrodes A and B of mercury switch 60 are electrically tied together and ultimately connected to the negative post of battery 32 through fuse 74 and either center stand switch 20 or security switch section 70B. Electrode C is connected to the sounder 24 which is ultimately tied to the positive post of battery 32 through protective components fuse 76A, diode 76B, and small resistor 76C. Sounder 24 of FIGS. 1 and 2 is any audible alarm emitting; device, and is implemented as an electromechanical buzzer, for example. This buzzer operates in a repetitive way which involves magnetism generated by current flowing in coil 52 pulling down sounder contact 50 from contact 48 interrupting the flow of current, permitting contact 50 to springably close again with contact 48, permitting current to flow, and causing the buzzing cycle to be repeated indefinitely as long as mercury switch 60 is closed and no disabling current is provided to disabling input 42A.

In the embodiment of FIG. 2, the authorized use of ignition switch 12 disables the alarm circuit of unit 22 when mercury switch 60 is closed. Closing ignition switch 12 passes current along line 23B through security switch section 70C when closed, through diode 42 and current limiting resistor 44 through coil 52 so that contact 50 is held down or open, thereby stopping any buzzing. This is because the disabling current is made just great enough to create enough magnetism to keep contacts 50 and 48 open, so that contact 50 cannot springably close with contact 48. In this way the conditions necessary for indefinite repetition of the buzzing cycle are precluded, disabling the buzzer implementation of sounder 24. When the disabling current is on, it is desirable to avoid significant current drain from battery 32 as well as consequent heating of coil 52 under the 100% duty cycle condition obtained during the disabling. Accordingly, current limiting resistor 44 is selected small enough to permit enough disabling current to flow to in fact disable the sounder 24 but large enough to limit the disabling current to the smallest practical value to accomplish the disabling function. The value in ohms of the resistor 44 will depend on, among other things, the spring constant of contact 50 and the electrical specification of coil 52 and its physical placement relative to contact 50.

When ignition switch 12 is opened, and if and when sounder 24 is sounding, diode 42 is advantageously back-biased preventing current through contacts 48,50 from bypassing coil 52 through resistor 44, diode 36 and ignition coil 38 to ground. In this way the disabling circuit 42, 44 limits or stops current in the sounder contacts from bypassing the sounder coil 52 through the disabling circuit. This advantage corresponds with the diode 42 conducting the disabling current through itself so that the disabling current can only pass through sounder coil 52 in the same direction as electrical current flows in sounder coil 52 when mercury switch 60 turns on buzzer or sounder 24.

Advantageously, there is minimal current drain on battery 32 in the condition of ignition-on, and alarm unit 22 disabled, because contacts 48,50 are open, thereby avoiding current flow through line 23A from battery 32, and due to resistor 44 limiting the otherwise larger current which would flow through buzzer coil 52. Fuses 76A and 74, mounted inside the alarm unit 22 compartment perform an advantageous safety function in protecting battery 32 from short-circuit in case of malfunction of the buzzer or wiring in the alarm circuit. In addition, fuse 76A performs an additional security function as described later herein.

More-sophisticated unauthorized persons are assumed to be capable of cutting cables, shorting circuits in a variety of ways, artificially propping center-stand switch 16, and applying external unauthorized voltages. A greater degree of security against such persons is afforded by backup-battery 72, fuse 76A, and security switch sections 70A, 70B, and 70C.

To illustrate some of the more-sophisticated cases, assume key 70K is turned to the "Maximum Security" position, wherein switch segments 70A, 70B, and 70C are turned clockwise to be closed, closed, and open respectively. Switch segment 70A connects a smaller backup 12 volt battery 72 provided in the alarm unit 22 compartment. Accordingly, cutting cable 23 fails to turn off power to the alarm circuit of unit 22. Switch segment 70B connects alarm circuit of unit 22 directly to frame 4 ground, so that in case cable 23 has not been cut, cutting cable 19 or propping center stand switch 20 fails to turn off power from battery 32 to the alarm circuit of unit 22.

Switch segment 70C disconnects the cable line 23B connection between ignition switch 12 and alarm circuit 100 disabling input 42A, in the "Maximum Security" switch position. In this way an unauthorized person using a lost, duplicated, or stolen ignition key 12K, as well as a person hotwiring anywhere in the ignition system or directly on ignition switch 12, cannot disable security alarm unit 22.

If cable wire 23A is shorted to ground after being cut unauthorizedly, in an attempt to discharge any internal battery prior to moving motorcycle 1, battery 72 back-biases diode 76B, thereby preserving the electrical integrity of the alarm circuit of unit 22. Application of unauthorized voltages on cable 23 lines 23A or 23B with respect to frame ground are unavailing to a thief because line 23B is opened by switch segment 70C and because fuse 76A will "blow" when a significant positive overvoltage is applied on line 23A. Diode 76B is provided with a small current-limiting resistor 76C selected in value so as not to affect the operation of sounder 24 but large enough in value to prevent overcurrent damage to diode 76B and battery 72, by an unauthorized tampering operation.

Application of unauthorized voltages on cable 19 fails to affect alarm circuit of unit 22 since cable 19 is shorted by switch segment 70B when in the "Maximum Security" mode.

It is to be understood that even in the "Medium Security" mode the inventive alarm apparatus provides security and convenience features regarded as superior to the prior art. The provision of the two-position Medium-Maximum security switch in FIG. 2 merely illustrates a variety of security features to which the invention is suited. In other embodiments, the security switch is suitably dispensed with and connections corresponding to it are wired or omitted as desired by the skilled worker.

In additional security features, not shown, additional mercury switches, mounted perpendicular to mercury switch 60 and mutually perpendicular to each other, detect bumps or motions or tilts along the yaw and pitch axes of motorcycle 1 as well as the roll axis. In one form of a mercury switch a center electrode corresponding to electrode C is placed in the center of a highly oblate envelope and a plurality of electrodes like A and B and suitably being eight in number are disposed around the envelope around the circumference of an imaginary circle. Other types of switches such as inertia switches are suitably used. Any of a variety of disturbance sensors are suitably used individually or in combination in the practice of the invention, with mercury types being used merely by way of illustration.

Application of unauthorized alternating currents, magnetic fields, radio frequencies, and radiant energy sources is defeated by providing security alarm unit 22 in a metal box shown as the dashed line 22 of FIG. 2. Such metal box is suitably made highly electrically conductive and magnetically permeable, as with a composite construction of iron or steel with an inner lining of copper. Bypass condensers 72A, 72B, and 72C from each cable line to the copper box lining reject alternating currents and radio frequency voltages unauthorizedly applied along the cable lines. Each cable line is suitably provided with a conductive shielding sheath and center conductor for further such rejection. In addition, detection circuitry is suitably provided, not shown, to set off the alarm if and when any shielded cable is cut, so as to bring shield and center conductor into electrical contact. Tampering on such shielded conductors for the mercury switch A,B,C lines sets off the alarm directly.

Some remarks relating to some of the psychological deterrence considerations are now made, using the motorcycle 1 as the example vehicle type. It is assumed that it is desirable to deter and prevent theft of the owner's motorcycle and, if the cycle is stolen, to maximize the likelihood of the owner or others being able to witness the act so as to make successful prosecution more likely.

The alarm response to the disturbance of the motorcycle by the thief should be as unpredictable as possible so as to attract attention of owner and bystanders and to make the thief nervous before and during the act. The alarm should turn itself off after a predetermined length of time so that energy will not be unnecessarily used and so that owner can elect not to approach the cycle.

Either local alarm indications on the motorcycle or distant alarm indications only, as by radio, are conceivably utilized. If the alarm is local, however, a thief is put on notice that the motorcycle has a security system which he is then possibly going to attempt to defeat, or is more likely to flee sooner and escape detection before anyone notices or observes him. Also, in another aspect of the local-versus-distant alarm dilemma, if the alarm response occurs distantly only, the thief is more likely to be able to take the motorcycle without detection by bystanders. Also, if the thief is aware of the presence of the security alarm either by prior knowledge or by observation, the lack of a local alarm also permits him to destroy the system with a lower likelihood of being noticed by bystanders. The receiver for a radio alarm may not be on, or the owner may be unavailable to notice it.

Local sound and light alarms also present conflicting considerations. An advantage of sound emission is that sound can be heard around corners. A disadvantage of sound emission is that it can be difficult to locate the origin of sound, as by a bystander, and that sound can be muffled by emergency vehicle and traffic noises and general neighborhood noises which are not insubstantial in many areas. Sound may not carry as far as radio.

An advantage of light emission is that light can be seen at night by bystanders even when sound might be muffled by background noises. Moreover, if the light emission is arranged to also throw light on the person of the thief, then a further deterrence and detection advantage is obtained. However, light emission may not be understood as an alarm by bystanders unless the light is of non-standard timing or unusual in some other way. A disadvantage of light emission is that it attracts attention of the thief to itself permitting destruction. Also, light emission may be indistinct to bystanders during the daylight hours or at night in high ambient light conditions.

Fortunately, the local versus distant alarm dilemma largely goes to the length of time it takes for the owner to notice and observe the motorcycle, or run to it, since it is the owner who as a practical matter will be needed to protect his property and to press charges. Since innocent disturbers are deterred by local alarm in addition to the considerations pertaining to thieves, the preferred embodiment utilizes local alarm with radio warning also includable at owner option.

The conflict between considerations involving sound and light alarm emissions is resolved by including both sound and light alarm emissions. The advantages of each type of emission thereby compensate for the shortcomings of the other. Using two different types of emission also forces a thief to be unable to destroy the light emitter, for example, without the sound emitter continuing to sound, or to destroy the sound emitter without the light emitter continuing. Both the sound emission and light-emission are made as attention-getting as possible. The emitting devices are advantageously provided multiply. For instance, both the vehicle horn and an internal alarm horn are preferably provided for alarm purposes to divide a thief's labors. The vehicle headlight, taillight and preferably an additional light for illuminating the thief in the central section of the motorcycle are also provided as multiple light emitters with harmonious and complementing functions.

Figure 3:
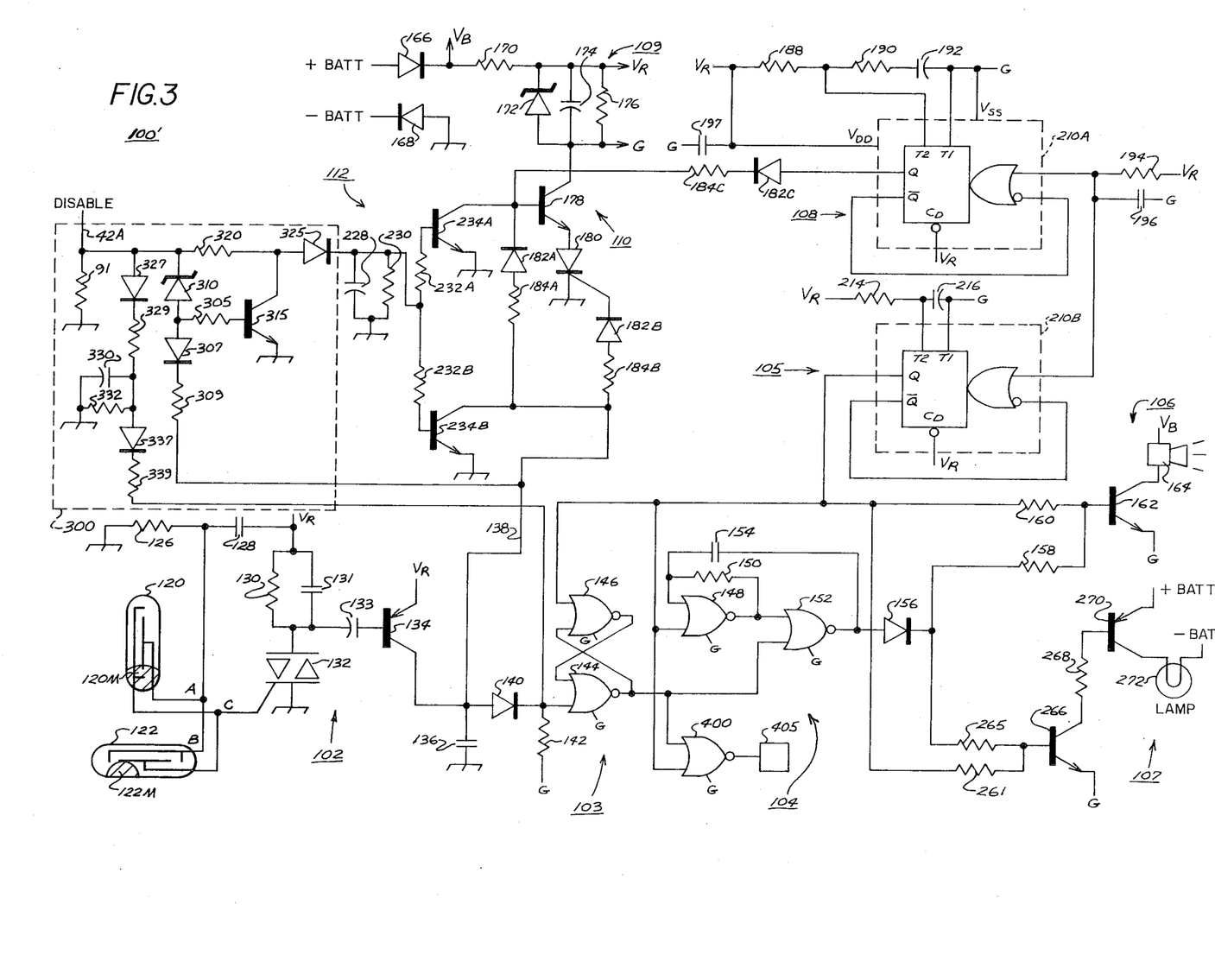
FIG. 3 is an electrical schematic diagram of a circuit portion 100' for use in substitution for circuit portion 100 of FIG. 2 so as to provide more complex security alarm emissions.

In FIG. 3 additional psychological deterrence advantages as just discussed are built into the security alarms of the invention by providing the alarm control circuit 100' of FIG. 3 in substitution for the alarm control circuit 100 of FIG. 2. In this way the inventive advantages of FIG. 2 are further augmented with those of the circuit of FIG. 3.

In FIG. 3, alarm control circuit 100' has sense circuit 102, latch circuit 103, beeper circuit 104, beep timer circuit 105, alarm sounder driver circuit 106, lamp driver circuit 107, power timer circuit 108, power supply circuit 109, power control circuit 110, and disabling circuit 112. Blocking circuit 300 is for the present purposes not regarded as being part of alarm control circuit 100', and where full battery voltage is used for disabling purposes at input 42A, as in FIG. 2 as drawn, blocking circuit 300 is omitted and input 42A is connected by a wire directly to capacitor 228. Circuit 300 is applicable as shown in FIG. 3 when a voltage reduction resistor 90 is added in the line 23B of FIG. 2. Discussion of circuitry 300 is omitted until discussion of FIG. 4.

Corresponding to the FIG. 2 connections denominated "+BATT" and "−BATT" for alarm control circuit 100, alarm control circuit 100' when provided in substitution is also provided with power at the points in FIG. 3 labelled "+BATT" and "−BATT". The disabling ignition input 42A of FIG. 2 corresponds also to the DISABLE input 42A of alarm control circuit 100' in FIG. 3. In sense circuit 102, mercury switch inputs A, B, and C are provided corresponding to the A, B, and C inputs of alarm control circuit 100 of FIG. 2.

The following operational features are provided in the alarm control circuit 100' in accordance with psychological deterrence considerations and with a view to enhanced owner convenience and power conservation.

A. With ignition switch 12 of FIG. 2 turned on, the alarm control circuit 100' is disabled, and its power supply 109 is deactivated by disabling circuit 112 and power control circuit 110. At no time when disabling voltage is provided to disabling circuit 112 at the DISABLE input, can alarm control circuit 100' go into the alarm mode.

B. When the ignition switch 12 is turned off, capacitor 228 and discharging resistor 230 keep the power supply 109 deactivated for approximately 5 to 15 seconds to allow the rider to get off the motorcycle.

C. Until the motorcycle is disturbed from its normal resting position on its side stand, power supply 109 is deactivated by power control circuit 110 regardless of whether there is a disabling input to disabling circuit 112. The first time the motorcycle is bumped or disturbed when the ignition switch 12 is turned off and the rider has gotten off, mercury switch 120 or 122 triggers sense circuit 102, which turns on power control circuit 110 and activates power supply circuit 109. Power supply circuit 109 energizes all the other circuits 103, 104, 105, 106, 107, and 108. On this first disturbance a five-second continuous tone sounds accompanied by a five-second light emission from the lamps connected to the alarm. Then the tone and light cease, while power timer circuit 108 keeps power control circuit 110 and power supply circuit 109 activated notwithstanding for the next minute or two.

D. If there is no additional disturbance during the activated time period of a minute or two, power timer circuit 108 deactivates power control circuit 110 and thereby power supply circuit 109, returning the alarm control circuit 100' to its deactivated state. However, if there is at least one additional disturbance during the activated time period, then beeper circuit 104 initiates a continuing "beep-beep-beep" alarm sound for the time interval, subsequent to cessation of that most nearly previous disturbance, remaining in the duration of the activated time period. Then the power timer circuit 108 deactivates alarm control circuit 100', waiting to go into operation again if and when the motorcycle 1 is once again disturbed. When the beeper circuit 104 is causing the continuing "beep-beep-beep" alarm sound, all alarm lamps such as 272 flash at the same rate as the repetition rate of the beeping sound, providing a further psychological aid to bystanders in locating the motorcycle 1. Corresponding radio alarm signals are also transmitted simultaneously with the sound and light alarm emissions, when a radio transmitter is included.

E. When the alarm power supply circuit 109 is deactivated, it does not pull battery current when ignition switch 12 is off, but the alarm circuit 100' automatically turns back on if the motorcycle is disturbed. When the alarm control circuit 100' is activated, it is advantageously immediately disabled by owner by turning ignition switch 12 on.

In FIG. 3, a first disturbance to perpendicularly mounted mercury switches 120 and 122 causes at least momentary electrical conduction by mercury 120M or 122M through at least one of the mercury switches. Mercury switches 120 and 122 are connected illustratively in parallel so that inputs A and B are joined to the junction of high resistance 126 and capacitor 128. Input C is connected to the gate input of a triac 132. Momentary electrical conduction by either mercury switch 120 or 122 permits capacitor 128 to send a spike to the gate of the triac 132. The spike makes the triac turn PNP transistor 134 on through capacitor 133. The spike is soon over, turning triac 132 off. Resistor 130 and capacitor 131 turn transistor 134 off through capacitor 133, so that the spike produces an amplified pulse across capacitor 136 as output from transistor 134.

Power supply circuit 109 is activated by power control circuit 110. Power control circuit 110 is turned on by the amplified pulse across capacitor 136 being conducted through resistor-diode pairs 184A,182A and 184B,182B, to the base of transistor 178 and the gate of SCR 180 respectively. Transistor 178 becomes conductive and SCR 180 turns on, bringing circuit-common power supply 109 point G close in voltage to the negative side of the battery. Then power supply circuit 109 provides a regulated voltage between its output $V_R$ and common point G by means of current-limiting resistor 170, zener diode 172, large filter capacitor 174, and swamping resistor 176. Power supply 109 thereby feeds circuits 103,104,105,106,107, and 108 only when supply 109 is activated.

As soon as power supply 109 becomes activated, monostable multivibrator (one-shot) operation is provided by power timer circuit 108 at output Q through diode-resistor pair 182C,184C to base of transistor 178, holding transistor 178 on and thereby SCR 180 on. Power timer circuit 108 is programmed by resistors 188, 190 and capacitor 192 to provide an output Q high for approximately 120 seconds or about 2 minutes. Afterwards output Q goes low, turning off power control circuit 110 and deactivating power supply circuit 109 by causing common G to rise in voltage up to the same voltage as point $V_R$.

As soon as power supply 109 becomes activated, monostable multivibrator (one-shot) operation for a shorter period of about 5 (five) seconds is provided by beep timer circuit 105. The Q output of this one-shot is high for about 5 seconds and then goes low for the remainder of the 2 minute power supply 109 activation period. The 5 second voltage high causes Piezo horn 164 to sound for 5 seconds in response to DC current from transistor 162 driven by input resistor 160 in alarm sounder driver circuit 106. In the meantime beeper circuit 104 is disabled by the circuit 105 output high conducted to NOR-gate 148 for 5 seconds. The amplified pulse at capacitor 136 resets flip-flop, or latch, circuit 103 through diode 140 and resistor 142, but the Q output high from circuit 105 immediately sets latch 103 again. Until a second pulse appears across capacitor 136, latch 103 disables beeper circuit 104 at NOR-gate 152 for the entire 2 minute activation period.

When and if a second disturbance causes a second pulse to appear across capacitor 136, after the first five warning seconds, latch 103 is thereby reset so that NOR-gate 144 has an output low. Since after the five seconds NOR-gate 146 has both inputs thereby low, the output of NOR-gate 146 is driven high holding the output of NOR-gate 144 low. Then beeper circuit 104 is freed of input voltage highs from circuits 103 and 105, and beeper circuit 104 goes into oscillation as a free-running multivibrator at a rate on the order of one cycle per second (1 Hertz) programmed by resistor 150 and capacitor 154. The repetitive output highs from NOR-gate 152 are conducted through diode 156 to alarm sounder driver circuit 106 and lamp driver circuit 107, causing the piezo horn 164 to emit "beep-beep-beep" sounds and lamp 272 to blink at the beeper circuit 104 repetition rate.

When a disabling input becomes available from ignition switch 12 of FIG. 2, capacitor 228 is charged and transistors 234A and 234B are turned on through resistors 232A and 232B respectively. Transistor 234A being on effectively shorts the base of transistor 178 to SCR 180 ground turning off both transistor 178 and SCR 180, regardless of any inputs to these components which would otherwise turn them on. Transistor 234B being on effectively holds resistors 184A and 184B at SCR 180 ground. In this way power supply circuit 109 is deactivated and kept from being reactivated as long as capacitor 228 is charged. When ignition switch 12 is turned off again, capacitor 228 discharges through resistors 232A, 232B, and 230 with a time constant of 5 to 15 seconds keeping power supply circuit 109 deactivated for approximately that extra length of time.

An example parts list for the circuit of FIG. 3 is as follows. Transistors 234A, 234B, 178 are each NPN, type 3704. Transistors 162 and 266 are NPN type MPS A13. Transistor 134 is PNP, type 3703. Power transistor 270 is PNP, type TIP 32 able to carry lamp current. (The optional radio transmitter, not shown, is suitably wired in parallel with lamp 272 to provide the power to turn on the radio transmitter at the beeper circuit 104 repetition rate.) Additional lamps are provided either in parallel with lamp 272 or by utilizing additional transistors of the type of transistor 270 with bases connected to resistor 268 and emitters connected to each other. Triac 132 is type SC146D; SCR 180 is 2N5060; Diodes 182A,182B,182C, 140,156 are each general purpose 1N914. Diodes 166,168 protect the circuitry from inadvertent reversal of battery polarity and are suitably type 1N4001. A dual monostable multivibrator such as the National Semiconductor CD4528BM/CD4528BC provides each of the two one-shots 210A and 210B of FIG. 3 in one chip. All four NOR-gates 144,146,148,152 are provided in the National Semiconductor CD4001M/CD4001C Quadruple 2-Input NOR Gate.

Resistor, resistor, capacitor 188,190,192 (activation timing) are 1 megohm, 120K, and 47 microfarado (mfd.). Resistor,capacitor 214,216 (5 second warning beep timing) are 220K and 10 mfd. Resistor, capacitor 150, 154 (beeper repetition rate) are 1 megohm and 0.15 mfd. Capacitor, resistor,resistor,resistor 228,230,232A,232B (disabling extra time) are 220 mfd., 470K, 100K, and 100K (resistor 230 reduced to 47K for shorter time if desired). Sense circuit components 126,128,130,131, 133,136,142 are 560K, 0.01 mfd., 47K, 0.47 mfd., 1 mfd., 1 mfd., and 100K. Resistors 158,160,261,265,184A and 184B are 10K ohm. Resistor 268 is 220 ohm. Power supply components 170,174,176 are 0.47 ohm, 3 watt; 220 mfd.; and 680 ohm. The 4528 IC components 184C, 197, 194,196 are 4.7K, 0.01 mfd, 220K, and 0.01 mfd. On each IC chip the $V_{DD}$ pin is tied to power supply point $V_R$, and the $V_{SS}$ pin is tied to power supply point G. The piezo horn 164 is an AMES-CO$\phi$ Piezo-A-Lert ® PAL-328N unit marked DC 3-28 volt, Max 20 mA, which provides a powerful clear, high-pitched tone in response to DC.

The preferred embodiment among other features provides first and second qualitatively different alarm indications to first and second disturbances, or two different pulses, occurring in the alarm. It is contemplated that the skilled worker suitably elects to design the circuitry to provide additional qualitatively different alarm indications or responses to different pulses or sense circuit conditions of whatever type. In substitution or in addition to the already-described responses, it is contemplated that the skilled worker will elect to provide sound generators for other types of sounds including speech, and provide nonauditory responses such as an automatically operated camera to photograph the thief and an automatically operated wheel-locking device. Sound generators can be found in a variety of chips including the Texas Instruments types SN76477, SN76488, and SN76495. Speech may be obtained by phonograph or tape recorder mechanisms or by means of integrated circuit chips. These sounds are suitably commenced in response to the Q output high of power timer circuit 108 for the first pulse; and in response to the high-output of optional NOR-gate 400 when the response is to occur only after the second disturbance. Correspondingly, a wheellock can be tripped by the Q output high of power timer circuit 108, and a camera is suitably triggered (snapshot or movie camera 405) in response to an output high from NOR-gate 400.

Using FIGS. 4 and 2, attention is now directed toward features permitting the detection of hotwiring so as to use the circuitry 300 of FIG. 3 to block the disabling circuit 112 and set off the alarm.

The detecting apparatus involves turn-on circuitry including the ignition switch, and disabling-and-alarm-causing circuitry 300, 112 built into the security alarm unit 22 in the illustrative embodiment.

The turn-on circuitry is constructed so as to (A) permit the battery 32 voltage to be conducted to the ignition system 38 when the turn-on circuitry is on, in the sense of ignition switch on-condition, (B) provide a modified battery voltage to a security voltage output, such as cable line 23B when the turn-on circuitry is on, but (C) block the voltage at the security voltage output from being the modified battery voltage when the turn-on circuitry is off and the ignition system 38 is energized as by hotwiring 80 to the ignition system 38, and (D) allow the voltage at the security voltage output to become a second voltage condition distinct from the modified battery voltage when the turn-on circuitry is off and the security voltage output is energized as by hotwiring.

Associated with the turn-on circuitry and provided at a suitable location as in the security alarm unit 22 is circuitry for (1) disabling the alarm in response to the modified battery voltage when the modified battery voltage appears at the security voltage output and (2) when the voltage at the security voltage output becomes the second voltage condition, causing an alarm signal to be emitted.

The modified battery voltage, or first voltage condition, is in the presently described embodiment a reduced and constant voltage such as 6 volts and the second voltage condition is suitably at or near the full constant battery voltage of 12 volts. In this example, then, the disabling and alarm-causing circuitry 300,112 is made voltage-sensitive so as to set off the alarm when 12 volts appears on the disabling cable line 23B. (It is to be understood that this is but one example, and it is contemplated that the skilled worker in the practice of the invention will also construct versions of the invention wherein an oscillator or pulse-generator near the ignition switch produces a varying AC voltage or pulse train, with ignition on as the first voltage condition, or modified battery voltage. The circuitry at the other end in unit 22 detects hotwiring when a second voltage condition such as constant battery voltage or AC of incorrect frequency appears on the cable line 23B. The possible designs for the first and second voltage conditions are thus quite numerous.)

A few examples of turn-on circuitry are herein disclosed in connection with the selection of first voltage condition as 6 volts, and second voltage condition as 12 volts. The disabling-and-alarm-causing circuitry 300, 112 is utilized in each case, as drawn in FIG. 3.

In a first example, as shown in FIG. 4, the turn-on circuitry has first and second ignition switch sections 12B and 12A and voltage-reducing resistor 90. Ignition switch section 12B connects vehicle battery 32 to the ignition system 38. Ignition switch section 12A connects the battery 32 to resistor 90. Resistor 90 connects the ignition switch section 12A to cable 23B, which is the security voltage output, and thence to circuitry 300 and the rest of the circuitry of FIG. 3. Circuitry 300 illustratively has a low input impedance on the order of 1000 ohms set by resistor 91 therein as seen to cable 23B line, so the voltage-reducing resistor 90 is suitably made equal in resistance to resistor 91.

In a second example, an ignition switch having at least two sections is used, as in FIG. 4, except that lead 85 of section 12B is not connected to battery 32 but instead to lead 86 of section 12A as indicated by arrows pointing to leads 85 and 86. Here section 12A connects battery 32 voltage to the section 12B, and switch section 12B connects section 12A to ignition system 38. Then voltage-reducing resistor 90 connects both sections 12A and 12B from lead 86 to cable line 23B and circuitry 300 of FIG. 3.

In a third example, the ignition switch 12 is provided as in FIG. 2 with the anti-hotwiring diode 36, and the voltage-reducing resistor 90 (as shown in FIG. 2) is added by connection to lead 36A so that resistor 90 feeds cable line 23B and circuitry 300. Here the turn-on circuitry is ignition switch 12, diode 36, and voltage-reducing resistor 90. Ignition switch 12 connects battery 32 to diode 36 and to resistor 90. The diode 36 connects the ignition switch 12 to ignition system 38 and is forward-biased when the ignition switch 12 is on. The resistor 90 connects the ignition switch 12 and the diode 36 to the circuitry 300.

In each of the foregoing examples, full battery current is conducted to the ignition system 38 when ignition is on. Also, a modified battery voltage of 6 volts is fed to cable line 23B when the ignition is on. However, when the ignition is off, the diode 36 of FIG. 2 or the section 12B of FIG. 4 blocks the voltage at cable 23B from being the modified battery voltage of 6 volts when the ignition is off and hotwire 80 is provided to ignition system 38. On the other hand, the turn-on circuitry in each example allows the voltage at the cable 23B to become the second voltage condition of 12 volts when the ignition is off and the cable line 23B is energized as by hotwiring 80B of FIG. 4.

Accordingly, with very few parts an inexpensive turn-on circuitry makes possible the detection of hotwiring, and prevents hotwiring from automatically disabling the alarm circuit.

With more parts, the turn-on circuitry even more advantageously accomplishes the functions of (C) blocking the security voltage output from being the modified battery voltage when the turn-on circuitry is off and the ignition system 38 is energized as by hotwiring and (D) allowing the voltage at the security voltage output to become a second voltage condition distinct from the modified battery voltage when the turn-on circuitry is off and the security voltage output is energized as by hotwiring. In such version, a PNP transistor 95 is built into or near the ignition switch turn-on circuitry assembly. Then if hotwiring 80A but not hotwiring 80B occurs, the transistor 95 places a full 12 volts onto the security voltage output line 23B. This happens because the 12 volts hotwired to ignition system 38 forward-biases the emitter-base junction of transistor 95, conducting full 12 volt battery voltage to the transistor 95 collector and thence to cable line 23. The base current of transistor 95 passes through resistor 90 to cable line 23. Diode 98 protects transistor 95 from burnout in case hotwiring 80B but not hotwiring 80A is first attempted. In normal use of the ignition switch 12 with ignition on, transistor 95 is turned non-conductive because the base-emitter junction is reversed-biased. Accordingly, resistor 90 operates in the proper voltage-reducing manner and cable line 23B is advantageously unaffected in voltage by transistor 95 collector unless hotwiring occurs.

Transistor 95 is compatible with either the multiple-section ignition switch of FIG. 4 or the switch 12 and anti-hotwiring diode 36 construction of FIG. 2.

The turn-on circuitry components are suitably provided secure near or in the ignition switch from unauthorized access. Then a thief only has access to battery voltage and lines from points 87 and 88 of the turn-on circuitry and hotwiring is deterred.

It is observed that resistor 90 acts as a component for providing a reduced voltage compared to battery voltage, only the reduced voltage being able to cause the disabling circuit 112 to disable the alarm. Circuit 300 acts to block the disabling circuit 112 when the battery voltage itself is provided to cable line 23B instead of the reduced voltage.

Circuitry 300 includes input impedance programming resistor 91, zener diode 310 and a transistor gate including base resistor 305, collector resistor 320 and NPN transistor 315. The zener breakdown voltage of diode 310 is selected to be a value lying between the reduced voltage of nominally 6 volts and the full battery voltage of 12 volts, a suitable zener value being 7 volts. Transistor 315 acts essentially like an open circuit for voltages at point 42A below about the zener voltage. Accordingly, circuitry 300 does not affect the disabling circuit 112 when the disabling line 23B is at zero volts (ignition off) or when the disabling line is energized with the ignition-on reduced voltage of 6 volts. However, when hotwiring occurs by application of hotwire 80B or 80A of FIG. 4, the disabling line or input 42A at least momentarily sees 12 volts, full battery voltage. The zener diode 310 conducts sufficient current through resistor 305 to turn transistor 315 on, shorting the diode 325 to ground and isolating or blocking the disable circuit 112 from the 12 volt hotwiring. Transistor 315 is prevented from burnout by a small current-limiting resistor 320 provided at input 42A and selected in value small compared to resistor 305. For example, if resistors 90 and 91 are on the order of 1K ohm each, resistor 320 is on the order of 680 ohms, and resistor 305 is on the order of 4.7K ohms. It is of course contemplated, that the skilled worker adjusts component values as desired to obtain the blocking operation, or provides another available circuit design to accomplish the voltage-sensitive blocking operation.

Advantageously, diode 325 isolates capacitor 228 from circuit 300 when transistor 315 is on, so that the discharge time constant of 5 to 15 seconds for normal operation is not affected. The low impedance of resistor 90 and circuitry 300 looking at capacitor 228 charges capacitor 228 in about half a second or less, so that ignition switch 12 disables the alarm quickly when an authorized person turns the ignition switch on. Resistor 320 and diode 325 cooperate so that the junction voltage drop remaining across transistor 315, when it is turned on, fails to charge capacitor 228 significantly.

Zener diode 310 is connected directly to input 42A and operates so that only when hotwiring occurs does a positive voltage appear at the resistor 305 end of the diode 310 and at diode 307. Diode 307 and resistor 309 conduct a positive voltage to the activation line 138 for power control circuit 110, turning it on in this way only when hotwiring is attempted.

Diode 327 and surge limiting resistor 329 charge capacitor 330 when either reduced voltage or full battery voltage appear at disable input 42A. Diode 337 and resistor 339 conduct current corresponding to the voltage on charged capacitor 330 to the latch circuit 103. When the power supply circuit 109 is activated and capacitor 330 is driving the latch circuit 103, as under a hotwiring condition, the alarm emits an initial long piercing tone immediately followed by a series of beeps. A single instance of hotwiring occurring only for a short period of time charges capacitor 330. Capacitor 330 discharges with a time constant set at least in part by resistor 332. This time constant is set somewhat in excess of the length of the initial long piercing tone, so as to hold the latch 103 on reset and start the beeping immediately after the initial tone ceases. The discharging is contemplated so that capacitor 330 will not otherwise affect the alarm emissions under other circumstances of disturbance which might occur to the vehicle a few minutes subsequent to the beginning of discharging.

From a circuit point of view in FIG. 3, beep timer circuit 105 provides the initial piercing long tone, setting latch 103. As soon as the initial tone is ceased by circuit 105, capacitor 330 with its long time constant immediately resets latch 103 and causes the series of beeps to commence in beeper circuit 104. Capacitor 330 eventually becomes discharged, but by this time latch 103 has been reset, by capacitor 330, and keeps the beeper circuit 104 in operation until power timer circuit 108 deactivates the alarm.

In circuitry 300, typical values for the specific embodiment illustrated are capacitor 330 is 220 mfd., resistor 332 is 470K ohm, surge resistor 329 is 390 ohms, and resistors 309 and 339 are 6.8K and 1K ohm respectively. Diodes 325, 307, 327, and 337 are general purpose diodes with sufficiently low forward resistance and high back resistance to accomplish the circuit functions. The high back resistance of diodes 325 and 327 keeps capacitors 228 and 330 from discharging quickly into resistor 91, for instance. The high back resistance of diode 307 keeps pulses from sense circuit 102 on activation line 138 from turning on transistor 315 and sounding the alarm when reduced voltage from ignition switch section 12A is supposed to be disabling the alarm when the vehicle is in normal operation by an authorized user.

When circuitry 300 is omitted from FIG. 3, diode 325 is suitably retained to avoid capacitor 228 from discharging, in the context of FIG. 2, back through diode 36 to the ignition system 38. When circuitry 300 is used, diode 325 also prevents capacitor 228 from discharging when transistor 315 is off and when the ignition switch has just been turned off by authorized user.

Sense circuit 102 is suitably omitted if and when the skilled worker elects to provide a specialized alarm for only detecting hotwiring, as by providing turn-on circuitry of FIG. 4 and circuitry 300 with the rest of the circuitry of FIG. 3.

In all cases it is to be understood that the hereinabovedescribed preferred embodiments, arrangements, apparatus, methods, and systems are merely illustrative of a small number of the many possible specific embodiments and methods which can represent applications of the principles of the invention. Numerous and varied other arrangements, embodiments, apparatus, methods, and systems can readily be devised in accordance with these principles by those skilled in the art without departing from the spirit and scope of the invention and so that the utility of the invention can be fully realized.

What is claimed is:

1. A motorized vehicle having an ignition switch, a vehicle battery, and an ignition system WHEREIN THE IMPROVEMENT COMPRISES alarm emitting means capable of being turned on;

means for disabling said alarm emitting means at least when said ignition switch is on;

sensing means for turning on said alarm emitting means when said ignition switch is off when said vehicle is disturbed; and means for blocking said disabling means when said battery is electrically connected to said ignition system but when said ignition switch is off.

2. The motorized vehicle claimed in claim 1 wherein said vehicle further comprises a center stand and means for preventing said alarm emitting means from being able to be turned on when said center stand is in a position for raising said vehicle.

3. The motorized vehicle claimed in claim 1 wherein said alarm emitting means comprises an electromechanical sounder having sounder contacts connected at a point with a sounder coil; and said disabling means comprises means for conducting a disabling current through said sounder coil to hold said contacts open thereby disabling said electromechanical sounder when said ignition switch is on.

4. The motorized vehicle claimed in claim 3 wherein said disabling current conducting means comprises diode means connected to said point for conducting said disabling current through said diode means so that said disabling current can only pass through said sounder coil in the same direction as electrical current flows in said sounder coil when said sensing means turns on said alarm emitting means.

5. The motorized vehicle claimed in claim 1 wherein said vehicle further comprises container means holding at least said alarm emitting means and said sensing means, said vehicle further comprising second battery means also being held inside said container means for powering said alarm emitting means when electricity from said vehicle battery is unavailable.

6. The motorized vehicle claimed in claim 5 wherein said vehicle further comprises means located within said container means for protecting said second battery means and said alarm emitting means from being rendered inoperative by at least one manipulation external to said container means.

7. Security alarm apparatus for use on a motorized vehicle having an ignition switch and an ignition system, said security alarm apparatus comprising alarm emitting means;

disturbance detection means for activating said alarm emitting means;

means for disabling said alarm emitting means when said ignition switch is on, said disabling means having an input for being connected to said ignition switch; and means for unidirectional conduction of current between said ignition switch and said ignition system to energize said ignition system when said ignition switch is on, said unidirectional conduction means having a first lead connected to said input of said disabling means and a second lead for being connected to said ignition system so that said unidirectional conduction means is connected between said ignition switch and said ignition system.

8. Security alarm apparatus as claimed in claim 7 wherein said security alarm apparatus further comprises means for automatically deactivating said alarm emitting means after a time interval subsequent to a cessation of a most nearly previous disturbance.

9. Security alarm apparatus as claimed in claim 7 wherein said security alarm apparatus further comprises means for keeping said alarm emitting means disabled for a period of time immediately subsequent to said ignition switch being turned from on to off.

10. Security alarm apparatus as claimed in claim 7 wherein said alarm emitting means comprises means for emitting a series of sounds continuing after a cessation of a most nearly previous disturbance to said disturbance detection means.

11. Security alarm apparatus as claimed in claim 10 wherein said alarm emitting means when activated emits a series of flashes of light also.

12. Security alarm apparatus for use on a vehicle, said security alarm apparatus comprising means for detecting at least a first disturbance and a second identical disturbance occurring to the vehicle; and means for providing a continuous sound of limited duration as a first alarm response to said first disturbance to the vehicle and subsequently providing a succession of sounds of another limited duration after the continuous sound as a second alarm response to said second identical disturbance to the vehicle, said providing means including means responsive to the detecting means for producing the first alarm response to said first disturbance to the vehicle, means for producing an electrical signal in response to said first disturbance to the vehicle and lasting longer than the first alarm response sound, and means responsive to the detecting means and said electrical signal producing means for producing the second alarm response after the first alarm response if the electrical signal is present and the second disturbance to the vehicle occurs.

13. Security alarm apparatus as claimed in claim 12 for use on a vehicle having an ignition system with an ignition switch, wherein said security alarm apparatus further comprises means for disabling said apparatus from providing any alarm response when the ignition switch of said vehicle is on and for keeping said apparatus disabled for a period of time immediately subsequent to said ignition switch being turned from on to off; and means for blocking said disabling means when the ignition system of the vehicle is energized but the ignition switch is off.

14. Security alarm apparatus for use on a vehicle having an ignition system with an ignition switch, said security alarm apparatus comprising means for detecting at least a first disturbance and a second identical disturbance occurring to said vehicle;

means for providing a first alarm response to said first disturbance and subsequently providing a second alarm response to said second identical disturbance, said second alarm response being qualitatively different from said first alarm response;

means for disabling said apparatus from providing any alarm response when the ignition switch of the vehicle is on; and means for blocking said disabling means when the ignition system of the vehicle is energized but the ignition switch is off.

15. Security system for use in a motorized vehicle having an ignition system and a vehicle battery having a battery voltage, said security system comprising turn-on means for (A) permitting said battery voltage to be conducted to said ignition system when said turn-on means is on, (B) providing a modified battery voltage to a security voltage output of said turn-on means whenever said turn-on means is on, but (C) blocking the voltage at said security voltage output from being said modified battery voltage when said turn-on means is off and said ignition system is energized as by hotwiring to said ignition system, and (D) allowing the voltage at said security voltage output to become a second voltage condition distinct from said modified battery voltage when said turn-on means is off and said security voltage output is energized as by hotwiring;

alarm emitting means capable of being caused to emit an alarm signal;

sensing means for causing said alarm emitting means to emit an alarm signal when said vehicle is physically disturbed; and means for (1) disabling said alarm emitting means in response to said modified battery voltage whenever said modified battery voltage appears at said security voltage output and (2) whenever the voltage at said security voltage output becomes said second voltage condition, causing said alarm emitting means to emit an alarm signal.

16. The security system claimed in claim 15 wherein said turn-on means comprises a first ignition switch section connecting said vehicle battery and said ignition system; voltage-reducing resistor means; and a second ignition switch section, said second ignition switch section connecting said vehicle battery to said voltage-reducing resistor means, said voltage-reducing resistor means connecting said second ignition switch section to said means for disabling and alarm-causing.

17. The security system claimed in claim 15 wherein said turn-on means comprises first and second ignition switch sections and voltage-reducing resistor means, said first ignition switch section connecting said vehicle battery to said second ignition switch section, said second ignition switch section connecting said first ignition switch section to said ignition system; said voltage-reducing resistor means connecting both said first and second ignition switch sections to said means for disabling and alarm-causing.

18. The security system claimed in claim 15 wherein said turn-on means comprises an ignition switch, a diode, and voltage-reducing resistor means, said ignition switch connecting said vehicle battery to said diode and to said voltage-reducing resistor means, said diode connecting said ignition switch to said ignition system and being forward-biased when said ignition switch is on, said voltage-reducing resistor means connecting said ignition switch and said diode to said means for disabling and alarm-causing.

19. Article for use in a motorized vehicle security system, said article comprising alarm emitting means capable of being caused to emit an alarm signal;

sensing means for causing said alarm emitting means to emit an alarm signal when said vehicle is physically disturbed;

means for disabling said alarm emitting means in response to a first voltage condition of an ignition switch conductor indicating that said motorized vehicle has its ignition switch on, thereby to keep said alarm emitting means from emitting an alarm signal even when said vehicle is physically disturbed; and means for responding to a second distinct nonzero voltage condition of said ignition switch conductor so as to block said second voltage condition from being received by said disabling means and so as to cause said alarm emitting means to emit an alarm signal, whereby hotwiring of said vehicle is made detectable.

20. Security system for use in a motorized vehicle having an ignition system and a vehicle battery having a battery voltage, said security system comprising turn-on means for (A) permitting said battery voltage to be conducted to said ignition system when said turn-on means is on, (B) providing a first voltage condition to a security voltage output of said turn-on means whenever said turn-on means is on, but (C) blocking the voltage at said security voltage output from being said first voltage condition when said turn-on means is off and said ignition system is energized as by hotwiring to said ignition system, and (D) allowing the voltage at said security voltage output to become a second voltage condition distinct from said first voltage condition when said turn-on means is off and hotwiring occurs;

alarm emitting means capable of being caused to emit an alarm signal; and voltage-sensitive means for causing said alarm emitting means to emit an alarm signal in response to the voltage at said security voltage output only when the voltage at said security voltage output become said second voltage condition.

21. The security system claimed in claim 20 wherein said first voltage condition is a constant voltage being less than said battery voltage and said second voltage condition is a constant voltage being greater than said first voltage condition.

22. Security alarm apparatus as claimed in claim 14 wherein said means for providing the first and second alarm response includes means responsive to the detecting means for producing the first alarm response for a limited time after said first disturbance, and means responsive to the detecting means and to the first alarm response producing means for causing the second alarm response if the second identical disturbance occurs and the first alarm response is completed.

23. Security alarm apparatus as claimed in claim 14 wherein said means for providing the first and second alarm response includes means responsive to the detecting means for producing the first alarm response to said first disturbance, means for producing an electrical signal for a predetermined time interval beginning with said first disturbance, and means responsive to the detecting means and said electrical signal producing means for producing the second alarm response after the first alarm response if the electrical signal is present and the second disturbance occurs.

24. Security alarm apparatus as claimed in claim 14 wherein said means for providing the first and second alarm response includes means responsive to the detecting means for producing a continuous sound of limited duration as the first alarm response to said first disturbance, and means for causing a succession of sounds of another limited duration after the continuous sound as the second alarm response to an instance of the second identical disturbance.

* * * * *